United States Patent
Lee

(10) Patent No.: US 8,310,774 B2
(45) Date of Patent: Nov. 13, 2012

(54) LENS DRIVE DEVICE

(75) Inventor: Sang Hee Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 12/988,015

(22) PCT Filed: Apr. 16, 2009

(86) PCT No.: PCT/KR2009/001990
§ 371 (c)(1),
(2), (4) Date: Nov. 17, 2010

(87) PCT Pub. No.: WO2009/128668
PCT Pub. Date: Oct. 22, 2009

(65) Prior Publication Data
US 2011/0051265 A1 Mar. 3, 2011

(30) Foreign Application Priority Data
Apr. 16, 2008 (KR) ................. 10-2008-0035148

(51) Int. Cl.
*G02B 7/02* (2006.01)
*G02B 15/14* (2006.01)
(52) U.S. Cl. ............... 359/824; 359/814; 359/698
(58) Field of Classification Search .......... 359/694–704, 359/811–824
See application file for complete search history.

(56) References Cited

U.S. PATENT DOCUMENTS

| | | | |
|---|---|---|---|
| 5,744,266 A * | 4/1998 | Nunome et al. | ............. 429/224 |
| 7,298,562 B2 * | 11/2007 | Sue et al. | ..................... 359/819 |
| 8,009,371 B2 | 8/2011 | Sue et al. | |
| 8,116,018 B2 * | 2/2012 | Park et al. | ..................... 359/823 |
| 2006/0153556 A1 | 7/2006 | Lee et al. | |
| 2006/0203627 A1 | 9/2006 | Osaka | |
| 2008/0055753 A1 | 3/2008 | Takahashi et al. | |
| 2008/0211955 A1 | 9/2008 | Avital et al. | |

FOREIGN PATENT DOCUMENTS

| | | |
|---|---|---|
| KR | 10-0548869 B1 | 1/2006 |
| KR | 10-2006-0122125 A | 11/2006 |
| KR | 10-2007-0075459 A | 7/2007 |
| KR | 10-0783362 B1 | 12/2007 |
| WO | WO-2007/026830 A1 | 3/2007 |
| WO | WO-2007/133013 A1 | 11/2007 |

OTHER PUBLICATIONS

European Search Report dated Dec. 16, 2011 in European Application No. 09732867.8, filed Apr. 16, 2009.
Office Action dated Jul. 25, 2012 in Chinese Application No. 200980116917.5, filed Apr. 16, 2009.

* cited by examiner

*Primary Examiner* — Mohammed Hasan
(74) *Attorney, Agent, or Firm* — Saliwanchik, Lloyd & Eisenschenk

(57) ABSTRACT

According to one embodiment, a lens drive device comprises: a housing; a yoke provided on the inside of the housing; a magnet secured to the yoke; a carrier which is located on the inside of the yoke and which is provided with a lens; a coil which is connected to the carrier and which interacts with the magnet; a spring for resiliently supporting the carrier; and a magnetic member connected to the carrier.

11 Claims, 1 Drawing Sheet

LENS DRIVE DEVICE

CROSS-REFERENCE TO RELATED APPLICATIONS

This application is the U.S. national stage application of International Patent Application No. PCT/KR2009/001990, filed Apr. 16, 2009, which claims priority to Korean Application No. 10-2008-0035148, filed Apr. 16, 2008, the disclosures of each of which are incorporated herein by reference in their entirety.

TECHNICAL FIELD

The disclosure relates to a lens driving apparatus.

BACKGROUND ART

Recently, as electronic appliances have tended toward multifunction, a camera is installed in the electronic appliances, such as a sound reproduction apparatus or a mobile communication terminal.

In general, the electronic appliance is manufactured in a small size such that a user can easily carry the electronic appliance. Thus, the camera installed in the electronic appliance is also manufactured in the small size.

Meanwhile, a carrier for installing a lens of a camera is supported by a spring. However, the carrier may be arranged deviating from the precise position due to the assembling tolerance of components of the camera and deformation of the spring, so the zero point of the lens may not be corrected.

In addition, since the carrier is supported by the spring, if the carrier is excessively fluctuated due to external impact applied thereto, the spring may be deformed.

DISCLOSURE

Technical Problem

The embodiment provides a lens driving apparatus having a novel structure.

The embodiment provides a lens driving apparatus capable of arranging a carrier equipped with a lens in the precise position.

The embodiment provides a lens driving apparatus capable of preventing a carrier equipped with a lens from being excessively fluctuated by external impact.

Technical Solution

A lens driving apparatus according to the embodiment may include a housing; a yoke installed in the housing; a magnet fixed to the yoke; a carrier provided inside the yoke to install a lens; a coil coupled with the carrier to interact with the magnet; a spring for elastically supporting the carrier; and a magnetic member coupled to the carrier.

ADVANTAGEOUS EFFECTS

The embodiment can provide a lens driving apparatus having a novel structure.

The embodiment can provide a lens driving apparatus capable of arranging a carrier equipped with a lens in the precise position.

The embodiment can provide a lens driving apparatus capable of preventing a carrier equipped with a lens from being excessively fluctuated by external impact.

BEST MODE

Mode for Invention

Figure 1:
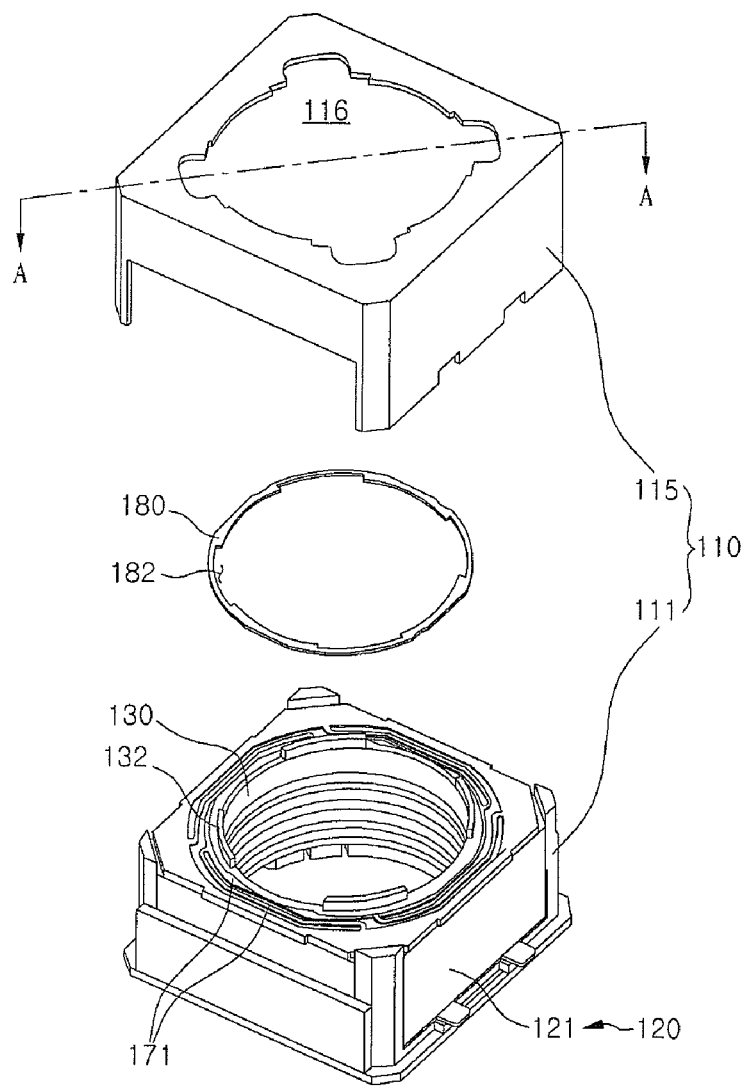
FIG. 1 is a partially exploded perspective view of a lens driving apparatus according to the embodiment.

The thickness and size of each layer shown in the drawings may be exaggerated, omitted or schematically drawn for the purpose of convenience or clarity. In addition, the size of elements does not utterly reflect an actual size.

Hereinafter, a lens driving apparatus according to the embodiment will be described in detail with reference to accompanying drawings.

Figure 2:
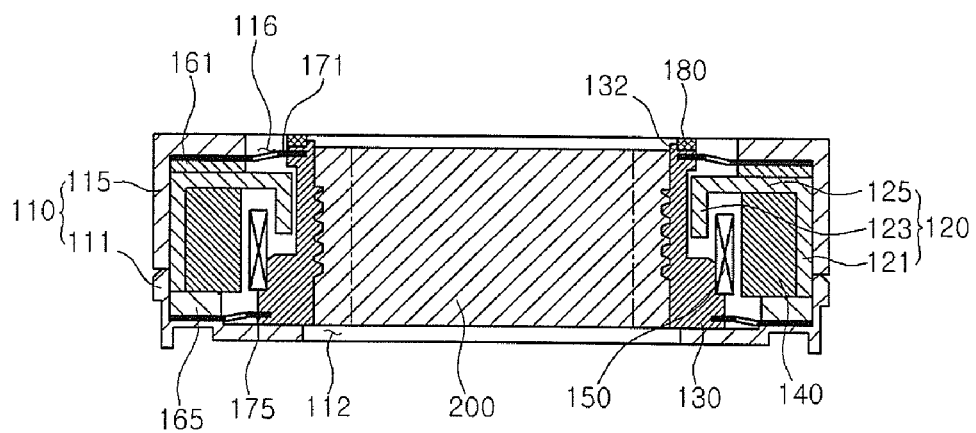
FIG. 2 is a sectional view taken along line A-A of FIG. 1.

FIG. 1 is a partially exploded perspective view of a lens driving apparatus according to the embodiment, and FIG. 2 is a sectional view taken along line A-A of FIG. 1.

Referring to FIGS. 1 and 2, the lens driving apparatus includes a housing 110 having a cavity therein. The housing 110 includes a base 111 and a cover 115 provided on the base 111 and coupled with the base 111.

The base 111 is formed with a first perforation hole 112 and the cover 115 is formed with a second perforation hole 116.

A yoke 120 is fixedly installed in the housing 110. The yoke 120 includes an outer yoke 121 having a rectangular frame shape with an outer peripheral portion fixed to the housing 110, an inner yoke 123 having a ring shape and installed inside the outer yoke 121, and a connection yoke 125 for connecting the outer yoke 121 to the inner yoke 123. The outer yoke 121, the inner yoke 123, and the connection yoke 125 can be integrally formed with each other.

A carrier 130 having a cylindrical shape is installed in the inner yoke 123 such that the carrier 130 can move up and down in the inner yoke 123. A lens 200 is coupled with the carrier 130, so that the lens 200 moves together with the carrier 130.

A magnet 140 is fixed to an inner peripheral surface of the outer yoke 121 and a coil 150 is fixed to an outer peripheral surface of the carrier 130 while facing the magnet 140. Thus, as current is applied to the coil 150, the coil 150 moves up due to the electromagnetic interaction between the coil 150 and the magnet 140, so that the carrier 130 coupled with the coil 150 is also moved up.

A top spacer 161 having a ring shape with elasticity is installed between the top surface of the yoke 120 and the bottom surface of the cover 115, and a bottom spacer 165 having a ring shape with elasticity is installed between the bottom surface of the yoke 120 and the top surface of the base 111.

Since the top and bottom spacers 161 and 165 have the elasticity, they can compensate for the dimensional tolerance and assembling tolerance of the housing 110 or the yoke 120.

The carrier 130 is supported by a top spring 171 and a bottom spring 174. As the current is applied to the coil 150, the carrier 130 moves up. In this state, if the current applied to the coil 150 is shut off, the carrier 130 moves down to the initial position thereof by the elasticity of the top and bottom springs 171 and 175.

The top and bottom springs 171 and 175 may include a plurality of rings, which are connected with each other and have diameters different from each other.

An outer peripheral portion of the top spring 171 is fixed to the cover 115 and interposed between the cover 115 and the top spacer 161. In addition, an inner peripheral portion of the top spring 171 is fixed to an upper portion of the carrier 130.

An outer peripheral portion of the bottom spring 175 is fixed to the base 111 and interposed between the base 111 and the bottom spacer 161. In addition, an inner peripheral portion of the bottom spring 175 is fixed to a lower portion of the carrier 130.

Meanwhile, a magnetic member 180 is installed on the carrier 130. For instance, the magnetic member 180 has a ring shape and is fixed to the top surface of the carrier 130 by an adhesive.

The magnetic member 180 is subject to the attractive force of the magnet 140 installed below the magnetic member 180. Thus, the carrier 130, on which the magnetic member 180 is installed, is biased downward, so that the bottom surface of the carrier 130 adheres to the top surface of the base 111.

In a state in which the carrier 130 makes contact with the base 111, the carrier 130 moves up due to the interaction between the magnet 140 and the coil 150. At this time, the carrier 130 and the base 111 may be arranged deviating from the precise position due to the assembling tolerance of the components of the lens driving apparatus or deformation of the spring caused by external impact.

In addition, if the external impact is applied to the lens driving apparatus, the carrier 130 elastically supported by the top and bottom springs 171 and 175 is excessively fluctuated, so that the top and bottom springs 171 and 175 are deformed or other components are damaged.

However, according to the lens driving apparatus of the embodiment, since the magnetic member 180 is installed on the carrier 130, the carrier 130 can be arranged in the precise position while being prevented from being excessively fluctuated by the external impact.

Meanwhile, in order to securely fix the magnetic member 180 on the carrier 130, a protrusion 132 is provided on the top surface of the carrier and an insertion slot 182 is formed in the magnetic member 180.

The insertion slot 182 of the magnetic member 180 makes contact with the protrusion 132 in the radially outward direction and circumferential direction, so the magnetic member 180 can be prevented from being rotated or separated from the carrier 130.

Although not shown in the drawings, the magnetic member 180 can be formed with an insertion hole, which makes contact with the protrusion 132 in the radially outward direction, radially inward direction and circumferential direction. In this case, the magnetic member 180 can be more securely fixed to the carrier 130.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

[Industrial Applicability]

The lens driving apparatus according to the embodiment is applicable to various types of camera devices.

The invention claimed is:

1. A lens driving apparatus comprising:
   a housing;
   a yoke installed in the housing;
   a magnet fixed to the yoke;
   a carrier provided inside the yoke to install a lens;
   a coil coupled with the carrier to interact with the magnet;
   a spring for elastically supporting the carrier; and
   a magnetic member coupled to the carrier;
   wherein a lower surface of the magnetic member is in physical contact with the carrier and spaced from the coil, and
   wherein an inner diameter of the coil is greater than an inner diameter of the magnetic member.

2. The lens driving apparatus of claim 1, wherein the housing includes a base and a cover installed on the base and coupled with the base.

3. The lens driving apparatus of claim 2, wherein the spring includes a top spring and a bottom spring, the top spring is fixed to an upper portion of the carrier and the cover, and the bottom spring is fixed to a lower portion of the carrier and the base.

4. The lens driving apparatus of claim 2, further comprising a top spacer interposed between the cover and the yoke with elasticity, and a bottom spacer interposed between the base and the yoke with elasticity.

5. The lens driving apparatus of claim 1, wherein the magnetic member is coupled with a top surface of the carrier.

6. The lens driving apparatus of claim 1, wherein the magnetic member has a ring shape.

7. The lens driving apparatus of claim 1, wherein the carrier is provided with a protrusion and the magnetic member is formed with an insertion slot coupled with the protrusion.

8. The lens driving apparatus of claim 7, wherein the magnetic member makes contact with the protrusion in a radially outward direction and a circumferential direction.

9. The lens driving apparatus of claim 1, wherein the carrier is provided with a protrusion and the magnetic member is formed with an insertion hole coupled with the protrusion.

10. The lens driving apparatus of claim 9, wherein the magnetic member makes contact with the protrusion in a radially outward direction, a radially inward direction and a circumferential direction.

11. The lens driving apparatus of claim 1, wherein the magnetic member is disposed above the magnet.

* * * * *